(12) United States Patent
Khatri

(10) Patent No.: US 10,402,215 B2
(45) Date of Patent: Sep. 3, 2019

(54) FIND GROUP DISTRIBUTE EXECUTE MODEL

(71) Applicant: SAP SE, Walldorf (DE)

(72) Inventor: Kavin Khatri, Brisbane (AU)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/878,039

(22) Filed: Jan. 23, 2018

(65) Prior Publication Data

US 2019/0227825 A1    Jul. 25, 2019

(51) Int. Cl.
| | |
|---|---|
| G06F 9/44 | (2018.01) |
| G06F 9/455 | (2018.01) |
| G06F 16/21 | (2019.01) |
| G06F 16/22 | (2019.01) |
| H04L 29/08 | (2006.01) |

(52) U.S. Cl.
CPC ........ G06F 9/45512 (2013.01); G06F 16/214 (2019.01); G06F 16/221 (2019.01); G06F 16/2282 (2019.01); H04L 67/10 (2013.01)

(58) Field of Classification Search
CPC .................................................. G06F 9/45512
USPC ........................................................ 717/115
See application file for complete search history.

(56) References Cited

U.S. PATENT DOCUMENTS

| | | | | |
|---|---|---|---|---|
| 2006/0247809 | A1* | 11/2006 | Sakoh ............... | G06F 17/30017 700/94 |
| 2009/0158251 | A1* | 6/2009 | Angrish ............ | G06F 17/30914 717/115 |
| 2016/0147833 | A1* | 5/2016 | Chaudhry ........... | G06F 17/3048 707/717 |

* cited by examiner

*Primary Examiner* — Evral E Bodden

(74) *Attorney, Agent, or Firm* — Schwegman Lundberg & Woessner, P.A.

(57) ABSTRACT

Systems and methods are provided for analyzing a script file to generate a list of commands associated with access of one or more tables in at least one database and analyzing the generated list of commands to determine the one or more tables to be accessed. The system and methods further provide for generating a grouping of the commands for each of the one or more tables to be accessed such that each table of the one or more tables has one or more associated commands, distributing each grouping of commands to be processed in parallel, executing the grouped commands in parallel to determine column names to be accessed for each of the one or more tables, and generating a result list comprising a list of table names and a list of column names for each table in the list of table names to be accessed by the script file.

20 Claims, 10 Drawing Sheets

400

```
SELECT IFNULL('Level1_' || "ADDR_INFO"."COUNTRY", 'ZZNoCountry') AS Level1Id, CASE
   "ADDR_INFO"."COUNTRY" AS Level1Name,
   "ADDR_INFO"."PROVINCE" AS Level2Id, CASE
   "ADDR_INFO"."PROVINCE" AS Level2Name,
   "ADDR_INFO"."STATE" AS Level3Id, CASE
   "ADDR_INFO"."CITY" AS Level3Name,
   A."INTERNAL_CODE" AS Level4Id, A.
   "OBJECT_NAME" AS Level4Name
FROM "[%ODS_DATABASE%]"."FO_LOCATION_T" A
INNER JOIN
 (
    SELECT INTERNAL_CODE, MAX(EFFECTIVE_START_DATE) AS EFFECTIVE_START_DATE
    FROM "[%ODS_DATABASE%]"."FO_LOCATION_T"
    GROUP BY INTERNAL_CODE
 ) LAST_LOCATION_RECORD ON A.INTERNAL_CODE = LAST_LOCATION_RECORD.INTERNAL_CODE
AND A.EFFECTIVE_START_DATE = LAST_LOCATION_RECORD.EFFECTIVE_START_DATE
INNER JOIN
 (
   SELECT DISTINCT EMP_JOB_INFO_T."JOB_LOCATION"
   FROM "[%ODS_DATABASE%]"."EMP_JOB_INFO_T"
 ) B ON CAST(A."INTERNAL_CODE" AS NVARCHAR(50)) = B."JOB_LOCATION"

LEFT OUTER JOIN
(
  SELECT DISTINCT EMP_JOB_INFO_T."COUNTRYID"
  FROM "[%ODS_DATABASE%]"."EMP_JOB_INFO_T"
 ) C ON C.COUNTRYID = ADDR_INFO.COUNTRYID

LEFT OUTER JOIN
(
  SELECT "FO_EVENT_REASON_T" "OBJECT_NAME" AS LABEL
FROM "[%ODS_DATABASE%]"."FO_EVENT_REASON_T"
WHERE CAST(B.EFFECTIVE_END_DATE AS DATE) = '9999-12-31'
 ) C ON C.COUNTRYID = ADDR_INFO.COUNTRYID
LEFT OUTER JOIN "[%ODS_DATABASE%]"."LABEL" COUNTRY_LABEL ON COUNTRY."OPTIONID" =
COUNTRY_LABEL."OPTIONID"
 AND COUNTRY_LABEL."LOCALE" = 'en_US'
LEFT OUTER JOIN "[%ODS_DATABASE%]"."PICKLIST" STATE ON "ADDR_INFO".STATE =
CAST(STATE."OPTIONID" AS NVARCHAR(20))
```

```
SELECT INTERNAL_CODE, MAX(EFFECTIVE_START_DATE) AS EFFECTIVE_START_DATE
FROM "[%ODS_DATABASE%]"."FO_LOCATION_T"
GROUP BY INTERNAL_CODE
----------------
"OBJECT_NAME"
FROM "[%ODS_DATABASE%]"."FO_LOCATION_T" A
----------------
EMP_JOB_INFO_T
SELECT DISTINCT EMP_JOB_INFO_T."COUNTRYID"
FROM "[%ODS_DATABASE%]"."EMP_JOB_INFO_T"
SELECT DISTINCT EMP_JOB_INFO_T."JOB_LOCATION"
FROM "[%ODS_DATABASE%]"."EMP_JOB_INFO_T"
----------------
SELECT "FO_EVENT_REASON_T" "OBJECT_NAME" AS LABEL
FROM "[%ODS_DATABASE%]"."FO_EVENT_REASON_T"
WHERE CAST(B.EFFECTIVE_END_DATE AS DATE) = '9999-12-31'
----------------
OPTIONID
"[%ODS_DATABASE%]"."LABEL"
----------------
OPTIONID
"[%ODS_DATABASE%]"."PICKLIST"
```

| Table | SQL |
|---|---|
| FO_LOCATION_T | SELECT INTERNAL_CODE, MAX(EFFECTIVE_START_DATE) AS EFFECTIVE_START_DATE<br>FROM "[%ODS_DATABASE%]"."FO_LOCATION_T"<br>GROUP BY INTERNAL_CODE<br><br>SELECT "OBJECT_NAME"<br>FROM "[%ODS_DATABASE%]"."FO_LOCATION_T" A |
| EMP_JOB_INFO_T | SELECT DISTINCT EMP_JOB_INFO_T."COUNTRYID"<br>FROM "[%ODS_DATABASE%]"."EMP_JOB_INFO_T"<br><br>SELECT DISTINCT EMP_JOB_INFO_T."JOB_LOCATION"<br>FROM "[%ODS_DATABASE%]"."EMP_JOB_INFO_T" |
| FO_EVENT_REASON_T | SELECT "FO_EVENT_REASON_T"."OBJECT_NAME" AS LABEL<br>FROM "[%ODS_DATABASE%]"."FO_EVENT_REASON_T"<br>WHERE CAST(B.EFFECTIVE_END_DATE AS DATE) = '9999-12-31' |
| LABEL | SELECT OPTIONID<br>FROM "[%ODS_DATABASE%]"."LABEL" |
| PICKLIST | SELECT OPTIONID<br>FROM "[%ODS_DATABASE%]"."PICKLIST" |

| Table | SQL |
|---|---|
| FO_LOCATION_T | INTERNAL_CODE,EFFECTIVE_START_DATE, OBJECT_NAME |
| EMP_JOB_INFO_T | COUNTRYID, JOB_LOCATION" |
| FO_EVENT_REASON_T | OBJECT_NAME, EFFECTIVE_END_DATE |
| LABEL | OPTIONID |
| PICKLIST | OPTIONID |

*FIG. 8*

FIND GROUP DISTRIBUTE EXECUTE MODEL

BACKGROUND

Transferring all tables to be accessed in a database for running a script (e.g., SQL script) from one or more source databases to one or more target databases may involve data of significant size (e.g., terabytes), may not be practical, and may consume significant resources both in the transfer of the data and storage of the data at the target.

BRIEF DESCRIPTION OF THE DRAWINGS

Various ones of the appended drawings merely illustrate example embodiments of the present disclosure and should not be considered as limiting its scope.

FIG. 4 illustrates an example script file, according to some example embodiments.

FIG. 5 illustrates an example generated list of commands, according to some example embodiments.

FIG. 6 illustrates an example of a grouping of commands, according to some example embodiments.

FIG. 8 illustrates an example result list, according to some example embodiments.

DETAILED DESCRIPTION

Systems and methods described herein provide for analyzing script files to generate groupings of commands which are then distributed and executed in parallel to determine tables and columns referenced in the script files. A script is a document representing a list of instructions or commands to be executed by a computing device or system. One example of a script is a SQL script which is a set of SQL commands saved as a file (e.g., saved as a script file). The script may comprise commands and subcommands (e.g., queries and subqueries) to access one or more databases. For example, a user (e.g., a lay person or technical person) may create a script to generate data about an employee, including a start date, job information, and the like. This functionality may be used by users in a human resources department of a company to look up information about an employee. Before the functionality is available to end users, data needed to execute the functionality may be transferred from a source database to a target database associated with the users that are using the functionality. Transferring all of the tables needed for the employee information may involve data of significant size (e.g., terabytes of data). Accordingly, the transfer and storage of the data at the target may consume significant resources.

Example embodiments provide systems, methods, and apparatuses to determine what data is actually needed by a script such that only the needed data may be transferred instead of transferring entire tables. Thus, instead of transferring entire tables (e.g., making up terabytes of data), example embodiments allow for a more efficient system and transfer of data (e.g., making up gigabytes of data). Moreover, example embodiments provide for an efficient mechanism for determining which data is needed for the script, by grouping commands by table and distributing and executing such commands in parallel.

Figure 1:
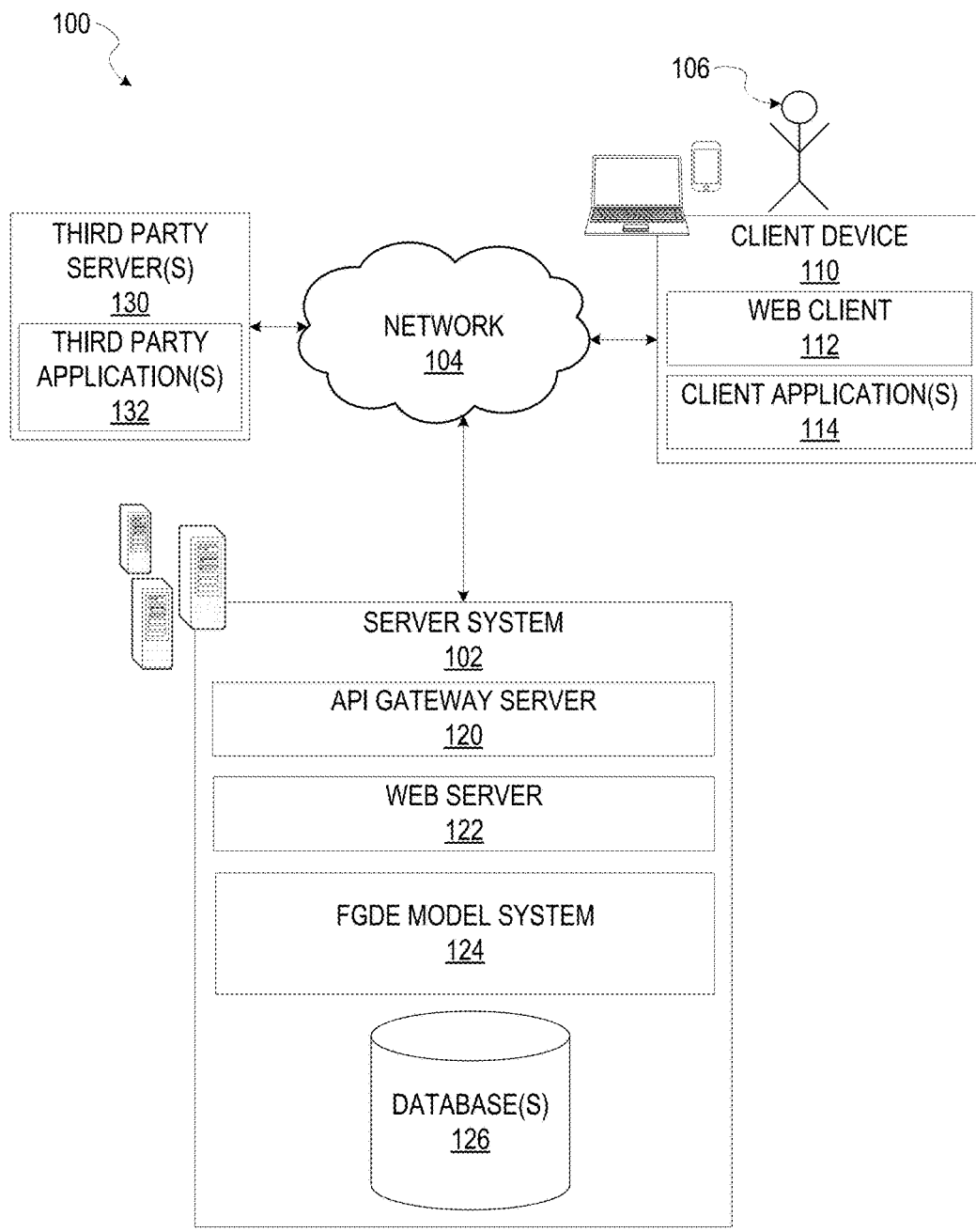
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alpha-numeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a digital assistant application, a smart agent service application, a customer support application, a human resources information application, and the like.

In some embodiments, one or more client applications 114 may be included in a given one of the client device 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access enterprise resource planning (ERP) or customer relationship management (CRM) data, to request data, to authenticate a user 106, to verify a method of payment, interact with smart agent services, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or WAN) to one or more third party servers 130 and/or one or more client devices 110. The server system 102 may include an application program interface (API) gateway server 120, a web server 122, and a find group distribute execute (FGDE) model system 124, that may be communicatively coupled with one or more databases 126 or other form of data stores.

The one or more databases 126 may be one or more storage devices that store data related to an enterprise system, user data, script files, and other data. The one or more databases 126 may further store information related to third party servers 130, third party applications 132, client devices 110, client applications 114, users 106, and so forth. The one or more databases 126 may include cloud-based storage in some embodiments. The one or more databases 126 may comprise data related to various product and services, support services data, and so forth.

The server system 102 may be a cloud computing environment, according to some example embodiments. The server system 102, and any servers associated with the server system 102, may be associated with a cloud-based application, in one example embodiment.

The FGDE model system 124 may manage resources and provide back-end support for third party servers 130, third party applications 132, client applications 114, and so forth, which may include cloud-based applications. The FGDE model system 124 may provide functionality for support services related to script files, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more of the third party applications 132 may request and utilize information from the server system 102 via the API server 120 to support one or more features or functions on a web site hosted by the third party or an application hosted by the third party. The third party website or application 132, for example, may provide various functionality that is supported by relevant functionality and data in the server system 102. The third party server(s) may have access to one or more databases (not shown) storing data related to tables and columns to be accessed via one or more script files.

Figure 2:
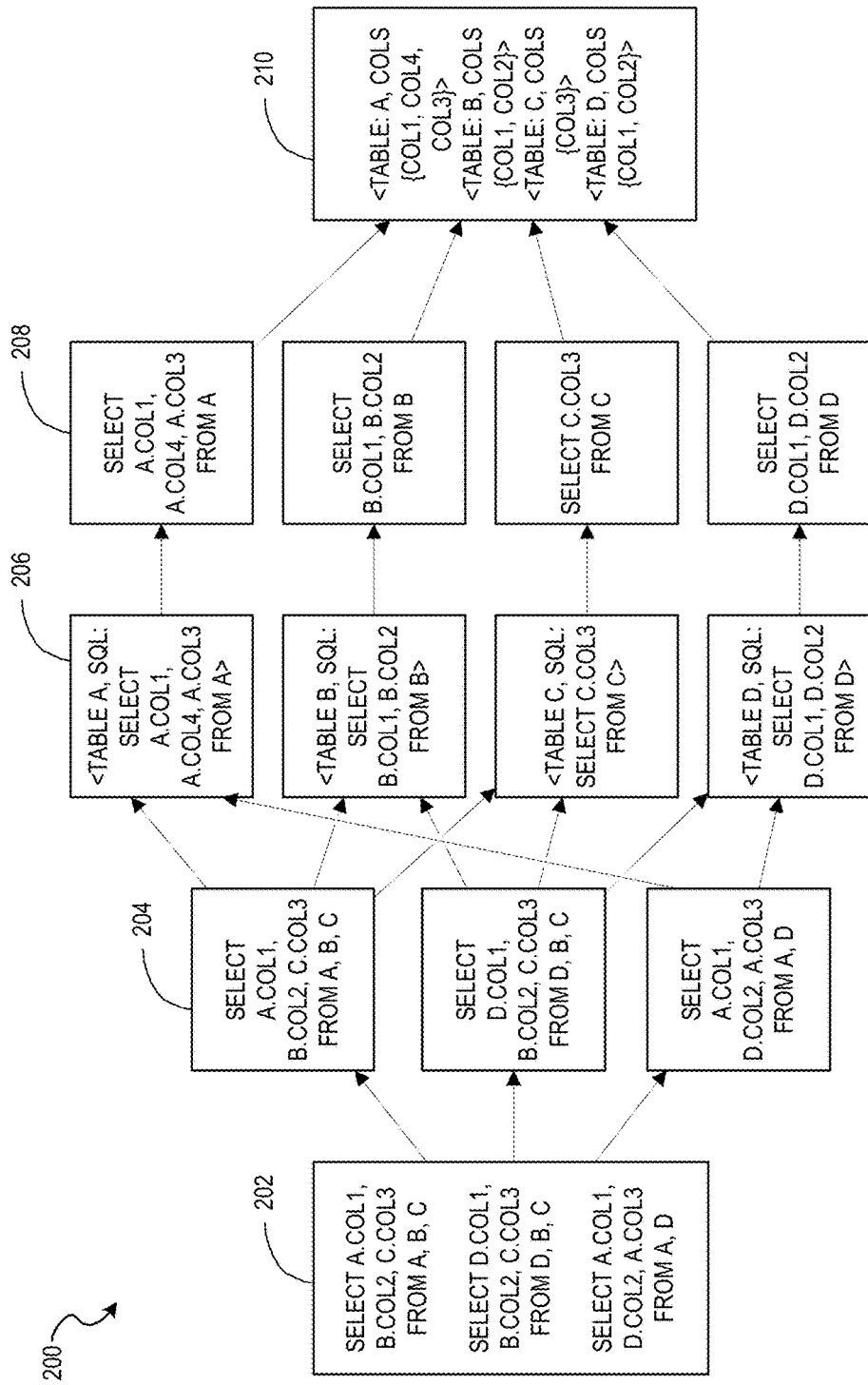
FIG. 2 is a block diagram illustrating a high-level view of aspects of a method, according to some example embodiments.

FIG. 2 is a block diagram 200 illustrating a high-level view of aspects of a method, according to some example embodiments. First, a computing system (e.g., server system 102 or FGDE model system 124) analyzes an original script file 202 to generate a list of commands 204 associated with access of one or more tables in at least one database. In this example, the original script file is a SQL script and the commands are SELECT statements. The computing system analyzes the list of commands 204 to determine one or more tables to be accessed and generates a grouping of the commands 206 for each of the one or more tables to be accessed. For example, the computing system finds all of the same tables that are used in the SQL script, including subqueries. In one example, the computing system may use regular expression code to search for each table and column within a SQL script. The computing system groups all of the same tables together and includes groupings of all of the sub queries with the same tables. As can be seen in FIG. 2, the grouping of the commands 206 comprise a particular table and associated columns to be accessed for that table.

The computing system then distributes and executes 208 each grouping of commands to be processed in parallel to determine column names to be accessed for each of the one or more tables. For example, the computing system distributes the grouping of commands 206 as shown in 208 to allow parallel processing to occur. The computing system takes each grouping of commands, as shown in 208, and allocates a parallel process (e.g., slot) to it. This allows the tables to be executed in parallel; therefore, they do not block each other. This approach distributes the load and allows efficiency. The computing system executes each parallel process and monitors it. Upon completion, the computing system gathers all resulting tables and columns.

The computing system then generates a result list 210 comprising a list of table names and a list of column names for each table in the list of table names to be accessed by the script file 202. The result list shows all of the columns referenced by the corresponding table.

Figure 3:
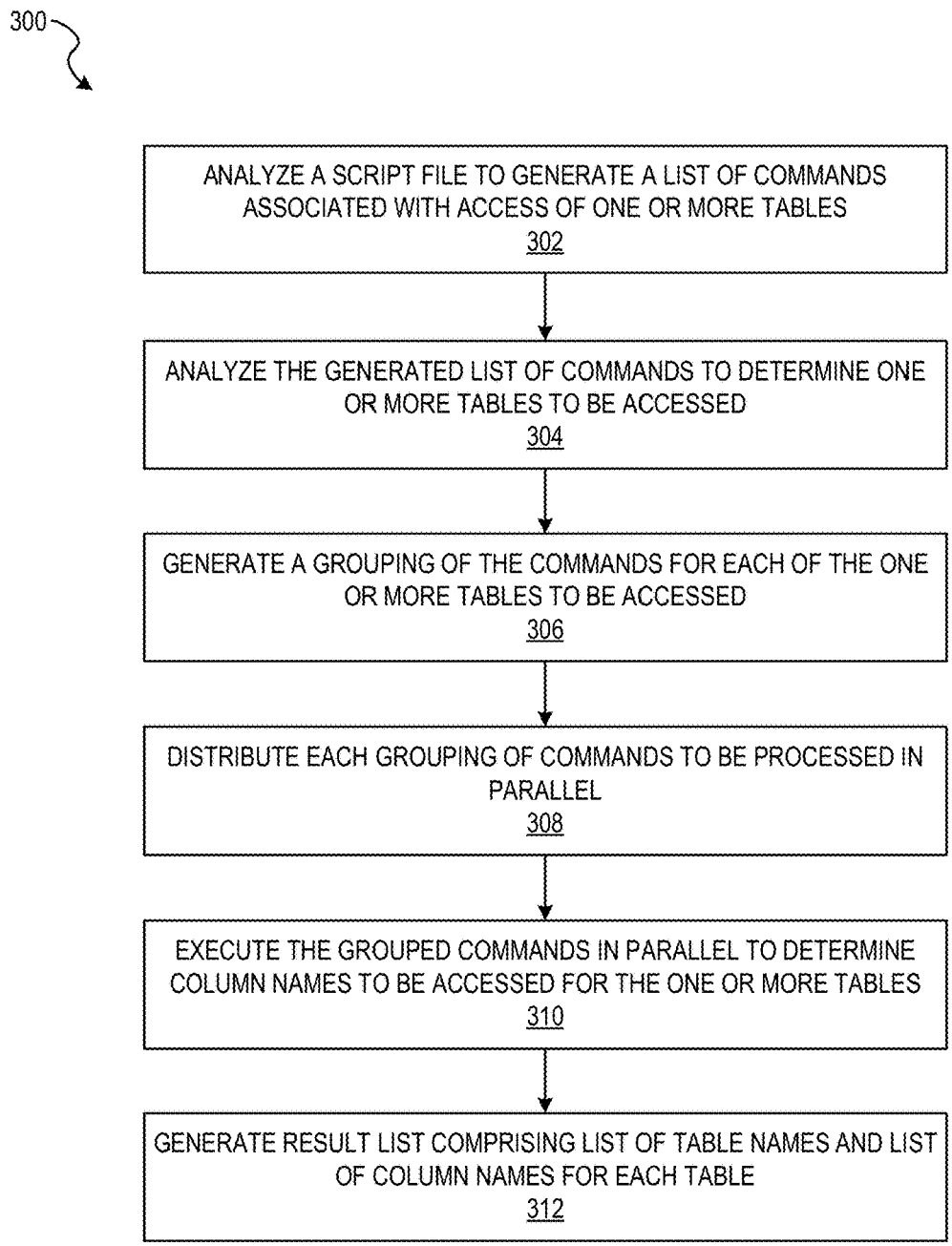
FIG. 3 is a flow chart illustrating aspects of a method, according to some example embodiments.

FIG. 3 is a flow chart illustrating aspects of a method 300, according to some example embodiments. For illustrative purposes, method 300 is described with respect to the networked system 100 of FIG. 1. It is to be understood that method 300 may be practiced with other system configurations in other embodiments.

In operation 302, a computing system (e.g., server system 102 or FGDE model system 124) analyzes a script file to generate a list of commands associated with access of one or more tables in at least one database. As explained above, a script file is a document representing a list of instructions or commands to be executed by a computing device or system. One example of a script is a SQL script, which is a set of SQL commands saved as a file (e.g., saved as a script file). The script may comprise commands and subcommands (e.g., including queries and subqueries) associated with at least one database (e.g., to access one or more databases). The computing system may analyze the script file by parsing the list of commands in the script file to determine commands associated with access to one or more databases. Using the example of a SQL script, the computing system may parse the SQL script to determine SELECT statements in the SQL script. A SELECT statement may be used in a script to retrieve a set of records from one or more tables in a database. While a SELECT statement is used here as an example, it is understood that other commands or instructions may be detected by the computing system that have similar functionality as accessing or reading data from a database (e.g., to retrieve one or more rows or columns from one or more database tables or database views).

FIG. 4 shows an example of SQL code 400 to be used to illustrate example embodiments. The example SQL code 400 comprises a number of commands including SELECT statements. FIG. 5 shows an example 500 of a list of commands generated by the computing system from the example SQL code 400 in FIG. 4.

Returning to FIG. 3, the computing system analyzes the generated list of commands to determine one or more tables to be accessed, in operation 304. For example, the computing system may parse the generated list of commands to find all tables that are used in the script file. In one example, this may include both queries and subqueries included in the script file. In one example, the computing system uses a regular expression code to search for each table and column within the script file. A regular expression is a pattern comprising of a sequence of symbols and characters expressing a sting or pattern to be searched for within a longer piece of text. An example of a table regular expression is (?<tableId>[A-Za-z0-9\_\-#]*?)\.(?<columnId>[A-Za-z0-9\_\-#] *?).

In operation 306, the computing system generates a grouping of commands for each of the one or more tables to be accessed, such that each table of the one or more tables has one or more associated commands. For example, the computing system groups all of the same tables together. In one example, this may include grouping all subqueries with the same tables. For each table, there are one or more associated commands, as shown in the table 600 of FIG. 6.

In one example, an alias may be used in the script file instead of the actual table name. In this case, the computing system determines the actual table name for each of the one or more tables, based on the aliases in the script file for each of the one or more tables. For example, "A" may be used as an alias or token for the actual table name "FO_LOCATION_T." Aliases may be defined in the script file and the computing system may use the definitions for the aliases to determine the actual table name.

Figure 7:
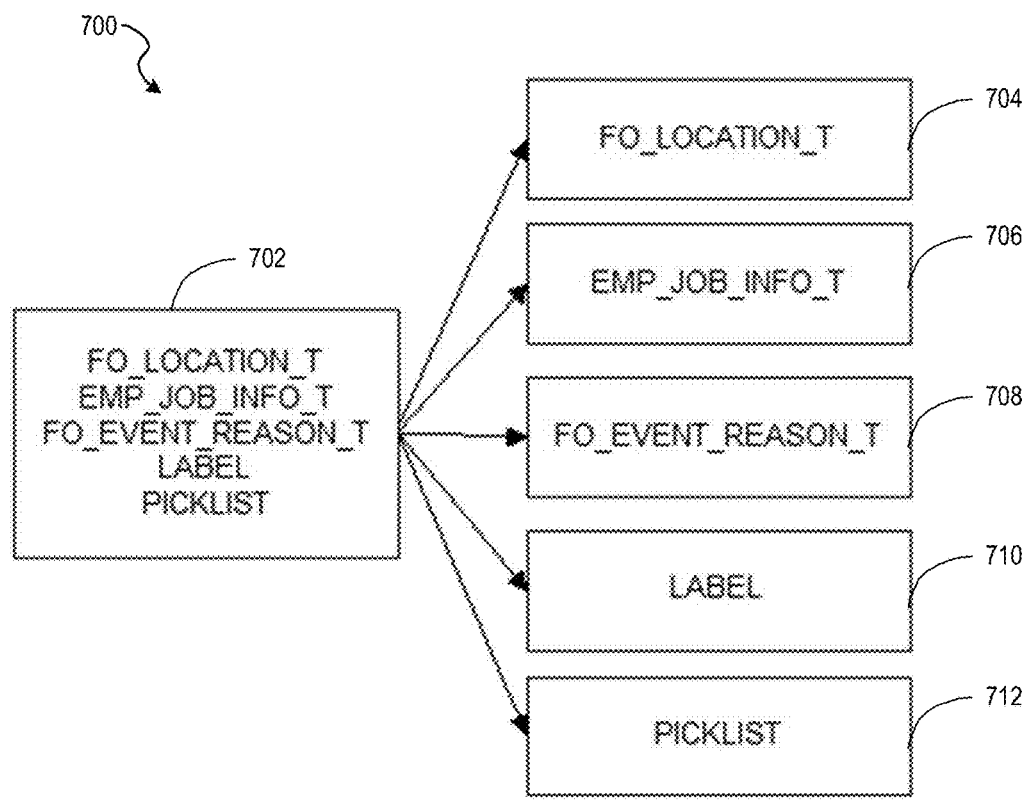
FIG. 7 illustrates an example of distributing a grouping of commands for parallel processing, according to some example embodiments.

In operation 308, the computing system distributes each grouping of commands to be processed in parallel. For example, the computing system takes each grouping of the grouping of commands and allocates a parallel process (e.g., slot) to it. This allows the grouping of commands to be executed in parallel, so they do not block each other. FIG. 7 shows a block diagram 700 illustrating how the grouping of commands 702 (e.g., the list of table names for the associated commands) are distributed such that each table and associated commands 704-712 are allocated a parallel process.

In operation 310, the computing system executes the grouped commands in parallel to determine column names to be accessed for each of the one or more tables. For example, the computing system executes each parallel process and monitors each parallel process until it is complete. Once the processing is complete, the computing system gathers all resulting tables and columns generated by processing the commands. For example, after each command (e.g., SQL statement) is executed, a column detection method may be used to get the tables and columns.

In operation 312, the computing system generates a result list comprising a list of table names and a list of column names for each table in the list of table names to be accessed by the script file. FIG. 8 shows one example of a results list 800. The result list may be provided to a computing device associated with a user. For example, a user (e.g., the user who created the script file or any user that wants to determine what data needs to be transferred for the script file) may send a request via a computing device (e.g., via client device 110 or via a third party server 130) to the computing system for a list of columns for tables to be accessed by the script file. The computing system may receive the request and process the request as described above. The computing system may return the result list to the computing device to be displayed on the computing device to the user.

Once the table names and columns to be accessed by the script are known, the data corresponding to the table columns may be transferred from a source data source (e.g., one or more databases 126 or other databases) to a target source (e.g., one or more databases associated with the script). The computing system may receive a request to transfer data from the at least one database to at least one target database based on the list of column names for each table in the list of table names to be accessed by the script file (e.g., based on the result list). The computing device may transfer the data from the at least one source database to the at least one target database, with the data comprising only data associated with the column names for each table instead of data for an entire table.

The following examples describe various embodiments of methods, machine-readable media, and systems (e.g., machines, devices, or other apparatus) discussed herein.

Example 1

A method comprising:

analyzing, by at least one processor of a computing system, a script file to generate a list of commands associated with access of one or more tables in at least one database;

analyzing, by the at least one processor of the computing system, the generated list of commands to determine the one or more tables to be accessed;

generating, by the at least one processor of the computing system, a grouping of the commands for each of the one or more tables to be accessed such that each table of the one or more tables has one or more associated commands;

distributing, by the at least one processor of the computing system, each grouping of commands to be processed in parallel;

executing the grouped commands in parallel to determine column names to be accessed for each of the one or more tables; and generating, by the at least one processor of the computing system, a result list comprising a list of table names and a list of column names for each table in the list of table names to be accessed by the script file.

Example 2

A method according to Example 1, wherein the script file comprises a plurality of commands associated with the at least one database.

Example 3

A method according to any of the previous examples, wherein the script file is a SQL script and the SQL script comprises a set of SQL commands.

Example 4

A method according to any of the previous examples, wherein analyzing a script file to generate the list of commands associated with access of one or more tables in the at least one database comprises parsing the script file to determine select statements in the script file and generating the list with the select statements.

Example 5

A method according to any of the previous examples, the method further comprising:
determining a table name for each of the one or more tables, based on aliases in the script file for each of the one or more tables.

Example 6

A method according to any of the previous examples, further comprising:
receiving a request to transfer data from at least one source database to at least one target database based the list of column names for each table in the list of table names to be accessed by the script file; and transferring the data from the at least one source database to the at least one target database, the data comprising only data associated with the column names for each table instead of data for an entire table.

Example 7

A method according to any of the previous examples, further comprising:
providing the result list to a computing device to be displayed on the computing device.

Example 8

A computing system comprising:
a memory that stores instructions; and
one or more processors configured by the instructions to perform operations comprising:
analyzing a script file to generate a list of commands associated with access of one or more tables in at least one database;
analyzing the generated list of commands to determine the one or more tables to be accessed;
generating a grouping of the commands for each of the one or more tables to be accessed such that each table of the one or more tables has one or more associated commands;
distributing each grouping of commands to be processed in parallel;
executing the grouped commands in parallel to determine column names to be accessed for each of the one or more tables; and
generating a result list comprising a list of table names and a list of column names for each table in the list of table names to be accessed by the script file.

Example 9

A computing system according to any of the previous examples, wherein the script file comprises a plurality of commands associated with the at least one database.

Example 10

A computing system according to any of the previous examples, wherein the script file is a SQL script and the SQL script comprises a set of SQL commands.

Example 11

A computing system according to any of the previous examples, wherein analyzing a script file to generate the list of commands associated with access of one or more tables in the at least one database comprises parsing the script file to determine select statements in the script file and generating the list with the select statements.

Example 12

A computing system according to any of the previous examples, the method further comprising:
determining a table name for each of the one or more tables, based on aliases in the script file for each of the one or more tables.

Example 13

A computing system according to any of the previous examples, further comprising:
receiving a request to transfer data from at least one source database to at least one target database based the list of column names for each table in the list of table names to be accessed by the script file; and transferring the data from the at least one source database to the at least one target database, the data comprising only data associated with the column names for each table instead of data for an entire table.

Example 14

A computing system according to any of the previous examples, further comprising:
providing the result list to a computing device to be displayed on the computing device.

Example 15

A non-transitory computer-readable medium comprising instructions stored thereon that are executable by at least one processor to cause a computing device to perform operations comprising:
analyzing a script file to generate a list of commands associated with access of one or more tables in at least one database;
analyzing the generated list of commands to determine the one or more tables to be accessed;
generating a grouping of the commands for each of the one or more tables to be accessed such that each table of the one or more tables has one or more associated commands;
distributing each grouping of commands to be processed in parallel;
executing the grouped commands in parallel to determine column names to be accessed for each of the one or more tables; and
generating a result list comprising a list of table names and a list of column names for each table in the list of table names to be accessed by the script file.

Example 16

A non-transitory computer-readable medium according to any of the previous examples, wherein the script file comprises a plurality of commands associated with the at least one database.

Example 17

A non-transitory computer-readable medium according to any of the previous examples, wherein the script file is a SQL script and the SQL script comprises a set of SQL commands.

Example 18

A non-transitory computer-readable medium according to any of the previous examples, wherein analyzing a script file to generate the list of commands associated with access of one or more tables in the at least one database comprises parsing the script file to determine select statements in the script file and generating the list with the select statements.

Example 19

A non-transitory computer-readable medium according to any of the previous examples, the method further comprising:

determining a table name for each of the one or more tables, based on aliases in the script file for each of the one or more tables.

Example 20

A non-transitory computer-readable medium according to any of the previous examples, further comprising:

receiving a request to transfer data from at least one source database to at least one target database based the list of column names for each table in the list of table names to be accessed by the script file; and transferring the data from the at least one source database to the at least one target database, the data comprising only data associated with the column names for each table instead of data for an entire table.

Figure 9:
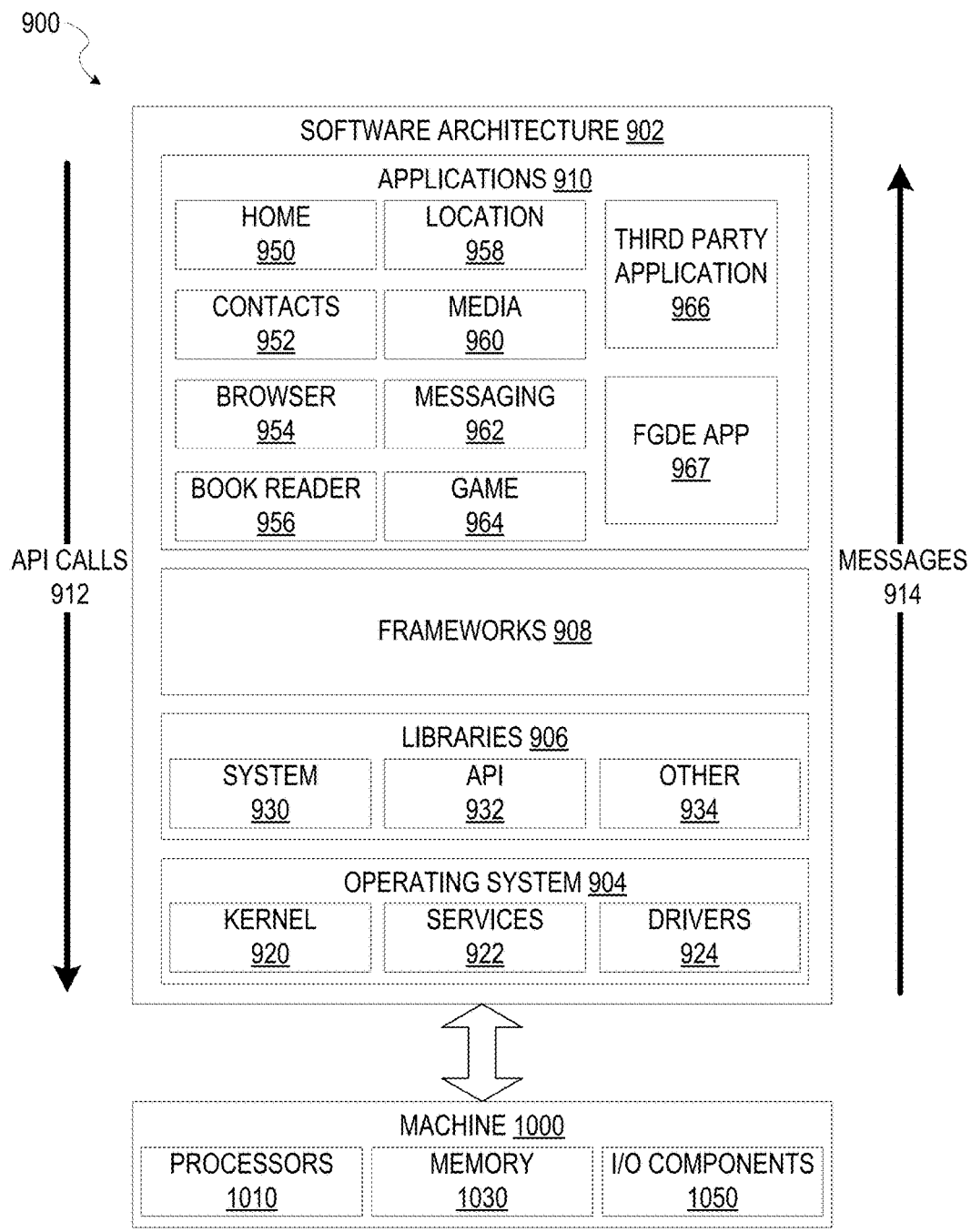
FIG. 9 is a block diagram illustrating an example of a software architecture that may be installed on a machine, according to some example embodiments.

FIG. 9 is a block diagram 900 illustrating software architecture 902, which can be installed on any one or more of the devices described above. For example, in various embodiments, client devices 110 and server systems 130, 102, 120, 122, and 124 may be implemented using some or all of the elements of software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010, memory 1030, and input/output (I/O) components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party applications 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a FGDE application 967, which may be any application that requests data or other tasks to be performed by systems and servers described herein, such as server system 102, third party servers 130, and so forth. In certain embodiments, this may be a stand-alone application that operates to manage communications with a server system such as third party servers 130 or server system 102. In other embodiments, this functionality may be integrated with another application. The FGDE application 967 may request and display various data related to script files and may provide the capability for a user 106 to input data related to the system via voice, a touch interface, a keyboard, or using a camera device of machine 1000, communication with a server system via I/O components 1050, and receipt and storage of object data in memory 1030. Presentation of information and user inputs associated with the information may be managed by FGDE application 967 using different frameworks 908, library 906 elements, or operating system 904 elements operating on a machine 1000.

Figure 10:
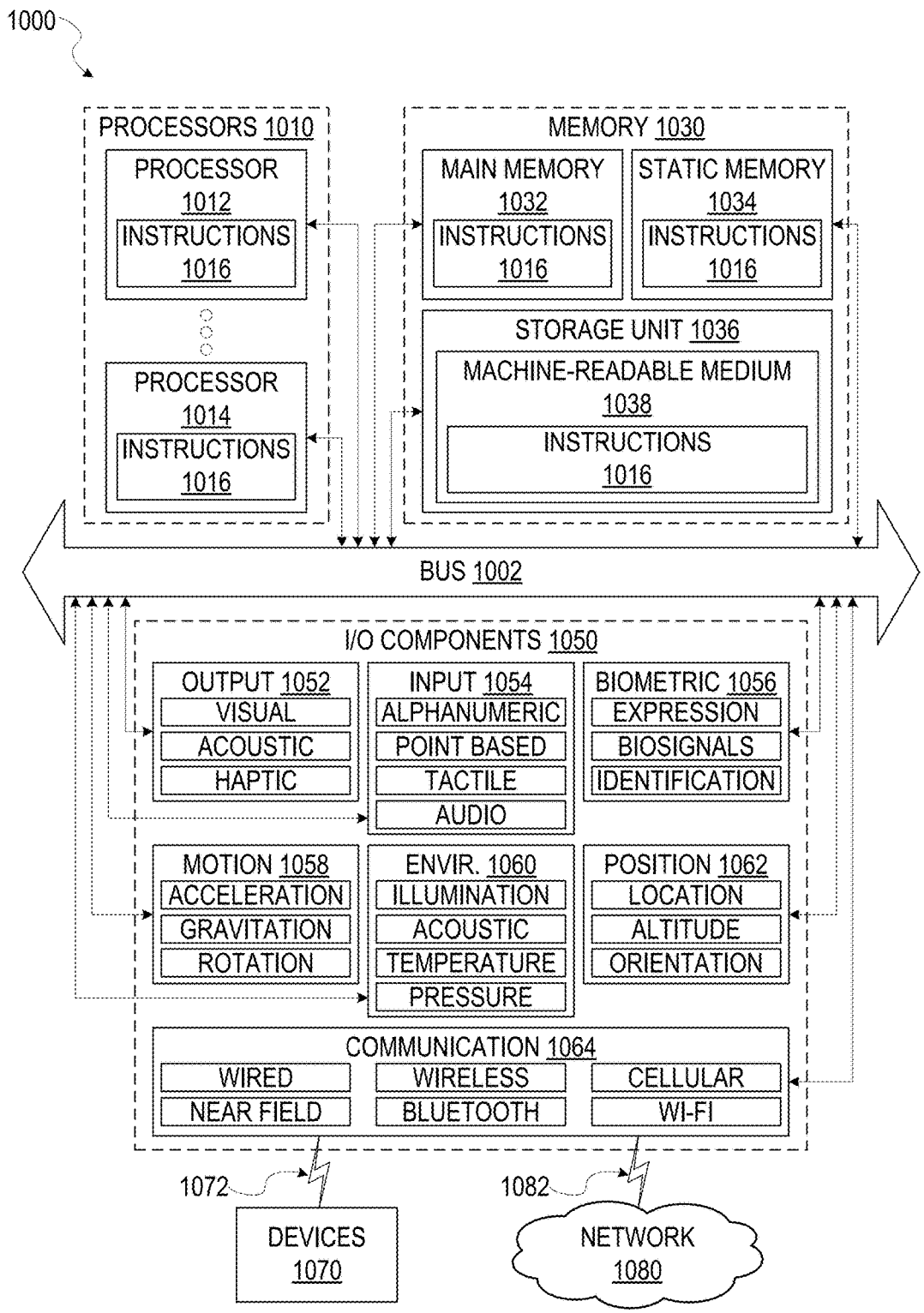
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or system 130, 102, 120, 122, 124, and the like, or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by at least one processor of a computing system, a request for a list of data to be transferred for execution of a script;
   generating, by the at least one process of the computing system, a result list corresponding to data needed for executing the script, by:
      analyzing, by the at least one processor of a computing system, the script to generate a list of commands in the script corresponding to access of one or more tables in at least one database;
      analyzing, by the at least one processor of the computing system, the generated list of commands in the script to determine the one or more tables to be accessed in the script;
      grouping, by the at least one processor of the computing system, the one or more tables to be accessed in the script to generate a grouping of the commands for each table of the one or more tables such that each table of the one or more tables has one or more associated commands in the script;
      distributing, by the at least one processor of the computing system, each grouping of commands such that each table and associated commands are allocated to a parallel process;
      executing the grouping of commands in parallel to determine column names to be accessed for each of the one or more tables;
      generating, by the at least one processor of the computing system, the result list corresponding to data for executing the script, the result list comprising a list of table names of the one or more tables to be accessed in the script and a list of the column names for each table in the list of table names to be accessed by the script; and
   providing, by the at least one processor of the computing system, the result list in response to the request for the list of data to be transferred for execution of the script.

2. The method of claim 1, wherein the script comprises a plurality of commands associated with the at least one database.

3. The method of claim 1, wherein the script is a SQL script and the SQL script comprises a set of SQL commands.

4. The method of claim 1, wherein analyzing the script to generate the list of commands in the script corresponding to access of one or more tables in the at least one database comprises parsing the script to determine select statements in the script and generating the list with the select statements.

5. The method of claim 1, the method further comprising:
   determining a table name for each of the one or more tables, based on aliases in the script for each of the one or more tables.

6. The method of claim 1, further comprising:
   receiving a request to transfer data from at least one source database to at least one target database based the list of column names for each table in the list of table names to be accessed by the script; and
   transferring the data from the at least one source database to the at least one target database, the data comprising only data associated with the column names for each table instead of data for an entire table.

7. The method of claim 1, wherein the provided result list is displayed on a computing device.

8. A computing system comprising:
   a memory that stores instructions; and
   one or more processors configured by the instructions to perform operations comprising:
      receiving a request for a list of data to be transferred for execution of a script;
      generating a result list corresponding to data needed for executing the script, by:
         analyzing the script to generate a list of commands in the script corresponding to access of one or more tables in at least one database;
         analyzing the generated list of commands in the script to determine the one or more tables to be accessed in the script;

grouping the one or more tables to be accessed in the script to generate a grouping of the commands for each table of the one or more tables such that each table of the one or more tables has one or more associated commands in the script;

distributing each grouping of commands such that each table and associated commands are allocated to a parallel process;

executing the grouping of commands in parallel to determine column names to be accessed for each of the one or more tables;

generating the result list corresponding to data for executing the script, the result list comprising a list of table names of the one or more tables to be accessed in the script and a list of the column names for each table in the list of table names to be accessed by the script; and providing the result list in response to the request for the list of data to be transferred for execution of the script.

9. The computing system of claim 8, wherein the script comprises a plurality of commands associated with the at least one database.

10. The computing system of claim 8, wherein the script is a SQL script and the SQL script comprises a set of SQL commands.

11. The computing system of claim 8, wherein analyzing the script to generate the list of commands in the script corresponding to access of one or more tables in the at least one database comprises parsing the script to determine select statements in the script and generating the list with the select statements.

12. The computing system of claim 8, the method further comprising:
determining a table name for each of the one or more tables, based on aliases in the script for each of the one or more tables.

13. The computing system of claim 8, further comprising:
receiving a request to transfer data from at least one source database to at least one target database based the list of column names for each table in the list of table names to be accessed by the script; and
transferring the data from the at least one source database to the at least one target database, the data comprising only data associated with the column names for each table instead of data for an entire table.

14. The computing system of claim 8, wherein the provided result list is displayed on a computing device.

15. A non-transitory computer-readable medium comprising instructions stored thereon that are executable by at least one processor to cause a computing device to perform operations comprising:
receiving a request for a list of data to be transferred for execution of a script;
generating a result list corresponding to data needed for executing the script, by:
analyzing the script to generate a list of commands in the script corresponding to access of one or more tables in at least one database;
analyzing the generated list of commands in the script to determine the one or more tables to be accessed in the script;
grouping the one or more tables to be accessed in the script to generate a grouping of the commands for each table of the one or more tables such that each table of the one or more tables has one or more associated commands in the script;
distributing each grouping of commands such that each table and associated commands are allocated to a parallel process;
executing the grouping of commands in parallel to determine column names to be accessed for each of the one or more tables,
generating the result list corresponding to data for executing the script, the result list comprising a list of table names of the one or more tables to be accessed in the script and a list of the column names for each table in the list of table names to be accessed by the script; and
providing the result list in response to the request for the list of data to be transferred for execution of the script.

16. The non-transitory computer-readable medium of claim 15, wherein the script comprises a plurality of commands associated with the at least one database.

17. The non-transitory computer-readable medium of claim 15, wherein the script is a SQL script and the SQL script comprises a set of SQL commands.

18. The non-transitory computer-readable medium of claim 15, wherein analyzing the script to generate the list of commands in the script corresponding to access of one or more tables in the at least one database comprises parsing the script to determine select statements in the script and generating the list with the select statements.

19. The non-transitory computer-readable medium of claim 15, the operations further comprising:
determining a table name for each of the one or more tables, based on aliases in the script for each of the one or more tables.

20. The non-transitory computer-readable medium of claim 15, the operations further comprising:
receiving a request to transfer data from at least one source database to at least one target database based the list of column names for each table in the list of table names to be accessed by the script; and
transferring the data from the at least one source database to the at least one target database, the data comprising only data associated with the column names for each table instead of data for an entire table.

* * * * *